(12) United States Patent
Schruff

(10) Patent No.: US 7,901,171 B2
(45) Date of Patent: Mar. 8, 2011

(54) BLIND FASTENER AND METHOD

(76) Inventor: Herbert Schruff, Oestrich-Winkel (DE)

( * ) Notice: Subject to any disclaimer, the term of this patent is extended or adjusted under 35 U.S.C. 154(b) by 586 days.

(21) Appl. No.: 11/982,287

(22) Filed: Nov. 1, 2007

(65) Prior Publication Data
US 2008/0138168 A1    Jun. 12, 2008

(30) Foreign Application Priority Data

Nov. 3, 2006 (EP) .................................. 06022882
Dec. 1, 2006 (EP) .................................. 06024927

(51) Int. Cl.
*F16B 13/06* (2006.01)
(52) U.S. Cl. ........................................... 411/38
(58) Field of Classification Search ............. 411/38, 411/182, 34
See application file for complete search history.

(56) References Cited

U.S. PATENT DOCUMENTS

| | | | | |
|---|---|---|---|---|
| 1,111,660 A | * | 9/1914 | Malaby | 411/38 |
| 1,881,973 A | * | 10/1932 | Schmitt | 411/38 |
| 2,148,977 A | * | 2/1939 | Buck | 411/38 |
| 2,384,347 A | | 9/1945 | Schutz | |
| 3,667,340 A | * | 6/1972 | Black et al. | 411/38 |
| 3,789,728 A | * | 2/1974 | Shackelford | 411/34 |
| 4,416,572 A | * | 11/1983 | Black | 411/38 |
| 4,869,629 A | * | 9/1989 | Witzigman | 411/38 |
| 4,875,815 A | * | 10/1989 | Phillips, II | 411/38 |
| 5,051,048 A | | 9/1991 | Maddox | |
| 5,191,991 A | | 3/1993 | Jackson | |
| 5,259,714 A | * | 11/1993 | Campbell | 411/34 |
| 6,538,894 B1 | * | 3/2003 | Treiber et al. | 361/724 |
| 6,893,196 B2 | * | 5/2005 | Wille | 411/34 |

FOREIGN PATENT DOCUMENTS

| | | |
|---|---|---|
| DE | 19808685 A1 | 9/1999 |
| DE | 69917827 | 7/2007 |
| EP | 033138 A2 | 9/1989 |
| EP | 1447576 A1 | 8/2004 |
| FR | 2073978 | 10/1971 |

* cited by examiner

*Primary Examiner* — Flemming Saether
(74) *Attorney, Agent, or Firm* — Price, Heneveld, Cooper, DeWitt & Litton, LLP

(57) ABSTRACT

A blind fastener has a setting head portion and a shank portion having one end connected with the setting head portion and an opposite end with an internal thread or a threaded bolt receptacle. The shank has a sidewall with an outside diameter smaller than the diameter of the setting head portion, and is configured for close reception in an aperture of the workpiece prior to being upset. The sidewall has a deformation area that is disposed between the setting head portion and the internal thread or the threaded bolt receptacle, and is upset radially outwardly to secure the fastener to the workpiece. The deformation area includes a central circumferential region which provides sole weakening for the sidewall.

13 Claims, 8 Drawing Sheets

BLIND FASTENER AND METHOD

CLAIM OF PRIORITY

Applicant hereby claims the priority benefits under the provisions of 35 U.S.C. §119, basing said claim of priority on European Patent Application Serial No. 06 022 882.2, filed Nov. 3, 2006 and European Patent Application Serial No. 06 024 927.3, filed Dec. 1, 2006. In accordance with the provisions of 35 U.S.C. §119 and Rule 55(b), certified copies of the above-listed European patent applications will be filed before grant of a patent.

BACKGROUND OF THE INVENTION

The present invention relates to fasteners, and in particular to a blind rivet element with a setting head and a shank. The shank has an internal thread or a receptacle for a threaded bolt at its distal end, and a deformation area between the internal thread or the bolt receptacle. The setting head has a larger outside diameter than the shank. The invention relates, furthermore, to a novel use of a blind rivet element.

Blind rivet elements of this type are designed, for example, as a blind rivet nut or a blind rivet threaded bolt.

Blind rivet elements have proven appropriate for fastening tasks, in which a screw connection is required in the region of thin-walled materials, for example metal sheets, into which a thread cannot normally be tapped or cut.

Blind rivet elements form a mating retainer flange by closing or upsetting the head. That is to say, they form a material fold or bead in the fastener. The smaller the material thickness for a thin-walled article, such as a metal sheet to which the blind rivet element is to be connected, the outside diameter of the bead is typically larger.

If the blind rivet element is designed, for example, as a blind rivet nut, it is fastened in the metal sheet and, after being fastened, makes a thread available for a screw connection. A blind rivet nut is normally set such that the blind rivet nut is first placed into a prefabricated hole in the metal sheet and is then riveted by means of a suitable tool of the type having a rotatable and axially displaceable threaded mandrel. For this purpose, the threaded mandrel is screwed from the setting head side into the internal thread of the blind rivet nut and is then displaced axially, such that a clinching of the deformation portion occurs and therefore forms a mating flange. In other words, a closing head is formed between the thread start and the underside of the metal sheet. The closing head, together with the setting head, anchor the blind rivet nut in the metal sheet. The threaded mandrel portion of the tool is subsequently unscrewed from the fastener. The blind rivet nut is then available as a receptacle for a fastening screw. If the blind rivet element is designed, for example, as a blind rivet threaded bolt, the shank has at its distal end a receptacle for a threaded bolt which, as a rule, is welded to the receptacle. The blind rivet threaded bolt is set correspondingly to the setting of the blind rivet nut, the difference being that a pull is exerted directly on the threaded bolt.

Conventional blind rivet nuts of the simplest type of construction, such as are described, for example, in DE 198 08 685 A1, which constitute blind rivet elements of the type mentioned in the introduction herein, have a region in the deformation portion where the closing head starts to be formed that is not well defined or set, but, instead, is dependent on the mounting arrangement which additionally also requires specific preconditions. Conventional blind rivet nuts can, for example, be riveted only in material of relatively high strength, preferably metals.

In these blind rivet nuts, the closing head is formed at half the distance between that region of the deformation portion where the latter emerges from the drill hole on the side facing away from the setting head and the start of the substantially thicker-walled threaded portion, corresponding to the lower resistance of the fastener. If the material does not have sufficient strength, such as, for example, plastic or what is known as the sandwich type of construction or the like, the formation of the closing head becomes undefinable or incomplete, with the result being that the blind rivet nut is not seated firmly, and may possibly bend sideways, or even the bead may be formed in outward folds and obstruct the unscrewing of the threaded mandrel or damage the latter. The result of the undefined or incomplete formation of the closing head is that conventional blind rivet nuts have only a highly limited clamping range, that is to say the range of different material thicknesses within which a blind rivet nut can be used, with the length of the deformation portion being the same, along with all the disadvantages attendant with this. Thus, for example, blind rivet nuts serving for receiving a screw of size M8 have a clamping range of only 2.5 mm and have to be produced in various range sizes, 0.5 to 3.0 mm, 3.0 to 5.5 mm, etc.

A blind rivet nut element of the type mentioned in the introduction herein is known, furthermore, from U.S. Pat. No. 3,789,728.

In this arrangement, the shank has, in the region of its deformation portion, a stepped inside diameter, while having a constant outside diameter. That region of the deformation portion which faces the setting head has a smaller wall thickness than that region of the shank which faces the internal thread. In this blind rivet nut, four slots extending parallel to the longitudinal axis of the shank are additionally provided, which pass through the shank and extend in one direction as far as the internal thread and in the opposite direction up to a distance from the setting head which corresponds approximately to the wall thickness of the thinnest-walled metal sheet, taking into account the clamping range of this blind rivet nut.

This blind rivet nut has the task of achieving bearing contact on the rear side of the metal sheet, which is as far away as possible from the center of the hole in the metal sheet, in order to avoid a deformation of the latter, in relatively thin and therefore unstable material, which leads or may lead to unbuttoning under load. This results at the same time in a large clamping range which, however, is achieved by virtue of high manufacturing costs, for example three times those of conventional blind rivet nuts. This blind rivet nut is therefore very long and consequently requires more material. This is also reflected in the machine costs. In addition, the introduction or fabrication of the slots is extremely costly, since such blind rivet nuts, as a rule, are produced in a continuous process, with considerable accompanying costs for the press and the press dies for pressing the long blind rivet nut. If this blind rivet nut is not used, as intended, but only to achieve a large clamping range, there is the risk that it is clamped only inadequately in the metal sheet on account of the slots and the rose consequently formed during riveting. Thus, when the blind rivet nut is being set, the webs located between the four slots are deformed radially outwardly in their free regions, hence where no metal sheet is located, until the legs of these regions of the webs lie on one another. The radial extent of the deformed portions of the blind rivet nut is consequently very great, with the result that its radially outer bearing contact on the metal sheet is very far away from the longitudinal axis of the shank.

On account of the long bending length of the respective web and because of the slots, there is no clearly defined region of the shank in which the deformation of the webs start, in relation to an identical thickness dimension of the metal sheet. In this type of blind rivet nut, it is a particularly serious disadvantage that, because of its length, it requires a deep construction space behind the metal sheet which is often not available. In such instances, therefore, such a blind rivet nut cannot be used. Even if further weakening of the shank wall was carried out in the region of the slots, (i.e., approximately at half the length of the respective slot, and, consequently, it were possible to bring about a directed deformation of the shank), such a blind rivet nut would, as before, have the disadvantage of the long length and therefore the restricted range of use, quite apart from the even higher manufacturing costs.

A further blind rivet nut is known from U.S. Pat. No. 5,259,714. In this design, four slots are arranged parallel to the longitudinal axis of the shank and extend over the entire length of the deformation portion. A stepped diameter in the region of the deformation portion is not provided in this blind rivet nut. This design has the same high manufacturing costs as the blind rivet nut according to U.S. Pat. No. 3,789,728. It, admittedly, makes it possible to have a widened clamping range, but it otherwise has the same problems as conventional blind rivet nuts. In this blind rivet nut, a deformation of the webs located between the four slots does not take place at a defined location of the deformation portion because of the long bending length of the webs. In the event of random deformation, there is the risk of insufficient fastening of the blind rivet nut.

U.S. Pat. No. 5,051,048 discloses a blind rivet nut which has a setting head and a shank, wherein the shank possesses a constant outside diameter, an internal thread at its distal end, and a deformation portion between the internal thread and the setting head. The shank possesses two shank portions between the internal thread of the shank and the setting head, with one shank portion facing the setting head, having a constant inside diameter, and being of relatively thin-walled design, while the other shank portion adjoining the first shank portion possesses an inside diameter tapering conically in the direction of the internal thread. The result is that the wall thickness of this shank portion increases toward the internal thread. The shank does not tend to be deformed in the transitional region of the two shank portions; the deformation is dependent on the thickness of the material into which this blind rivet nut is riveted. This design achieves a slight widening of the clamping range, and a defined or complete formation of the closing head is not obtained. All the same problems as in conventional blind rivet nuts therefore remain.

DE 699 17 827 T2 describes blind rivet elements which are designed as a blind rivet nut or blind rivet threaded bolt. The blind rivet nut, in its deformation portion, has four slots running parallel to the longitudinal axis of the blind rivet nut and therefore has those disadvantages described above. The blind rivet threaded bolt is not provided with slots in the deformation region, but, instead, with outer knurled grooves. This ensures that, during the setting of the blind rivet threaded bolt and, consequently, the clenching deformation of the deformation portion, the knurled grooves hook into the metal sheet in the region of its hole for receiving the blind rivet threaded bolt and in the marginal regions of the metal sheet which are adjacent to the hole.

SUMMARY OF THE INVENTION

One object of the present invention is to develop a blind rivet element of the type mentioned in the introduction herein, wherein those disadvantages of prior art blind rivet elements are avoided in that the formation of the closing head in the deformation portion is exactly defined.

This object is achieved by a blind rivet element of the type mentioned in the introduction herein, wherein the shank has a weakening of the shank wall solely in a central circumferential region of the deformation portion.

Owing to the weakening in the central circumferential region of the deformation portion, the wall of the shank is destabilized in this discrete region in order to prepare for bending. The outward bending of the deformation portion is therefore to start at the locations determined by the weakening. The weakening of the shank wall occurs only in this central circumferential region. In the other regions, the shank wall remains unweakened, with the result that the entire wall thickness is available there.

Thus, according to one aspect of the present invention, there is provision for the weakening of the shank wall to take place, on the one hand, in a central region of the deformation portion and, on the other hand, in a circumferential region of the deformation portion. Weakening therefore does not take place, as in the prior art, over the long length of the deformation portion, for example due to the slots having the long length. Rather, the weakening is oriented in the circumferential region of the deformation portion, hence in the region in which the bead has been formed after the setting of the blind rivet element.

Since the present blind rivet does not have long slots with webs located between them, the blind rivet nut can have a substantially shorter build or profile, and has a different configuration of the bead. The bead takes the form of a very large, essentially continuous bearing surface, in contrast to large sector regions in which a blind rivet element having slots running along its longitudinal extent does not bear with their closing head against the metal sheet. There is therefore also no risk that the blind rivet element connected to the metal sheet will rotate in relation to the latter during subsequent screwing. The clamping force of the riveted blind rivet element is therefore substantially higher.

The weakening of the shank wall may take place over the entire or part of the entire circumference of the shank wall, on the inner and/or the outer circumference of the shank.

If the weakening of the shank wall is to occur only in part regions of the circumference, this may take place in various ways. Thus, for example, there is provision for the weakening to be formed by a plurality of holes in the shank and/or a plurality of slots in a shank which are arranged transversely with respect to the longitudinal axis of the shank and/or a plurality of slots in the shank which are arranged parallel to the longitudinal axis of the shank and extend over a short length. Only in these discrete regions is the wall of the shank destabilized in order to prepare for bending. The outward bending of the deformation portions is therefore to start at the locations determined by the weakening.

Since no long slots are required extending essentially over the length of the deformation portion in the longitudinal direction of the deformation portion, the blind rivet element can have a very short build or profile, along with a substantially larger clamping range. Owing to the fact that, during setting, the bending of the blind rivet element starts in a specific region of the blind rivet element, and, consequently, a bulging bend can be determined in a clearly defined manner during the setting of blind rivet element as a function of the thickness of the metal sheet, and the blind rivet element can be set accurately. The outer distance of the closing head, in this case formed, from the longitudinal axis of the shank is substantially shorter than in the variant, known from the prior art, with the long slots running along the longitudinal extent of the shank.

According to one particular embodiment of the invention, there is provision for the holes and/or the slots to pass through the shank. This is advantageous because during the setting of the blind rivet element, the holes or slots are subjected to tangential forces as a result of the deformation of the shank which lead to the situation where the holes are deformed in the tangential direction into a non-round or even slot-shaped form or where the slots already present before the deformation of the blind rivet element are likewise deformed in the circumferential direction of the shank. It is basically sufficient if the weakening is formed by a plurality of holes in the shank and/or a plurality of slots, but these holes or slots do not pass through the shank, instead weakening the shank wall in the radial direction. In this case, during the setting of the blind rivet element and the deformation of the deformation portion, the deformation of the holes or slots will take place, and in this case, cracks will be generated there in the shank wall, with the result that the holes and/or slots then pass through the shank in the way described above. During the further deformation of the deformation portion, the holes or slots passing through the shank are further deformed tangentially and consequently break open further.

In order to achieve the results according to the present invention, it is important only to weaken the shank in the defined central circumferential region of the deformation portion, although other possibilities for bringing this about are also perfectly acceptable. It is conceivable, for example, to weaken the shank wall in the central wall region at a multiplicity of points by means of a laser.

According to a further advantageous embodiment of the present invention, there is provision for the weakening according to the invention to be formed by a continuous groove in the shank, in particular an outer groove arranged on the shank. This groove can be made particularly simply during the production of the blind rivet element according to the invention. In particular, when the rotationally symmetrical blind rivet element is produced by lathe turning, an outer groove can simply be introduced particularly into the shank. The groove is thus arranged on a circumferential circle of the shank, the circle plane being arranged perpendicular to the shank longitudinal axis.

The blind rivet element can be produced particularly simply and cost-effectively if the shank has a constant inside and/or outside diameter between the setting head and the internal thread of the shank. Ideally, therefore, the shank has neither an outer nor an inner jump in diameter in this region.

It is particularly advantageous if the holes and/or slots are arranged on a circumferential circle of the shank, wherein the circle plane is oriented perpendicular to the longitudinal axis of the shank. As a result, during the setting of the blind rivet element, largely identical deformation forces are introduced into the deformation portion.

It is perfectly sufficient if only two holes or slots are provided. There are, however, preferably three or more holes or slots. These holes or slots are distributed, in particular, at an equal distance from one another over the circumference of the shank. In the case of four holes, the holes form an angle of 90 degrees with one another.

A combination of a hole or holes and a slot or slots could be provided in the blind rivet elements. The structurally simplest configuration of the blind rivet element according to the present invention has holes possessing a circular cross section. These holes are punched or drilled during the production of the blind rivet element. The holes may, for example, be modified to the effect that they are designed to be oval or as long holes, in particular with an extent of their main axis which is transverse or parallel to the longitudinal axis of the shank. These holes are consequently not designed to be as elongate as slots which have a higher length/width ratio. The holes may have a drop-shaped configuration, an arrangement of the drop shape being considered advantageous, in which the drop tip of the drop is oriented in the longitudinal direction of the shank and is arranged so as to be directed away from the setting head.

It is considered advantageous if the distance of the center of the holes and/or slots from the internal thread or the receptacle for the threaded bolt is approximately as great as their distance from the setting head.

The blind rivet element may be designed as a blind rivet nut or as a blind rivet threaded bolt.

The present invention therefore proposes a blind rivet element with a relatively short overall length, but with a particularly large clamping range. The blind rivet element has the weakening of the shank wall in a central circumferential region of the deformation portion, hence at a distance from the internal thread or the receptacle for the threaded bolt. By means of a blind rivet element according to the invention, which is designed as a blind rivet nut and serves for receiving a screw of size M8, a clamping range of 0.5 to 7.0 mm can be provided, which is therefore almost three times as large as in the blind rivet nut described in the introduction. The shank has the weakening of the shank wall solely in the central circumferential region of the deformation portion. The central circumferential region extends axially over a short length of the shank.

In the present blind rivet element, the formation of the closing head in the deformation portion is exactly defined, such that there is no sign of the problem occurring in conventional blind rivet nuts, wherein the blind rivet element is not seated firmly or may possibly bend sideways, or the bead to be formed outward folds inward. The possibility of riveting the blind rivet element according to the present invention to a component in a defined way affords a substantially widened range of use of the blind rivet element. The blind rivet can also be connected to insufficiently firm material, such as, for example, plastic or a material involved in what is known as a sandwich type of construction, where the closing head engages behind a wall of the component. There is also the possibility of using the blind rivet element for riveting to a component in such a way that the blind rivet element is inserted into a hole of the component and the closing head of the blind rivet element, with said closing head being formed after the deformation of the latter, and engaging radially into a recess of the component. Consequently, in this arrangement, the closing head no longer engages behind the component, as in a conventional use of the blind rivet element, so as to bear against the component wall facing away from the setting head. Instead, the closing head is positioned positively in the recess of the component. This recess, into which the closing head engages, may be formed even before the setting of the blind rivet element or may be formed during the setting of the blind rivet element. In the last-mentioned instance, there is provision for the component to be designed deformably at least in the region of the closing head and for the recess in the component to be formed, during the setting of the blind rivet element, by means of the closing head which is formed. The material of the component is, in particular, softer than the metallic blind rivet element. The component may be, for example, a component which consists of wood and is therefore deformable.

Further features of the invention are illustrated in the description of the figures and in the figures themselves, and it is pointed out that all the individual features and all combinations of individual features are essential to the invention.

These and other advantages of the invention will be further understood and appreciated by those skilled in the art by reference to the following written specification, claims and appended drawings.

BRIEF DESCRIPTION OF THE DRAWINGS

The invention is illustrated, by way of example, in the figures with reference to several embodiments for different uses, without being restricted to these.

In the figures.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIGS. 1-5. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
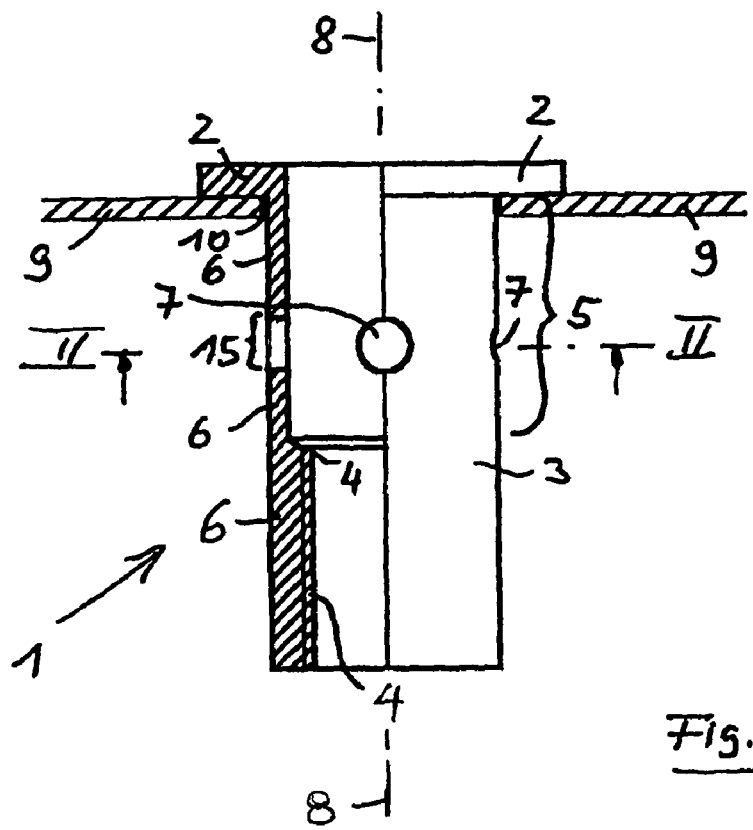
FIG. 1 shows a side view and partially sectional view of a first embodiment of the blind rivet element according to the invention which is designed as a blind rivet nut and is inserted into a relatively thin-walled component, before the setting of the blind rivet nut, the component taking the form of a metal sheet.
Figure 2:
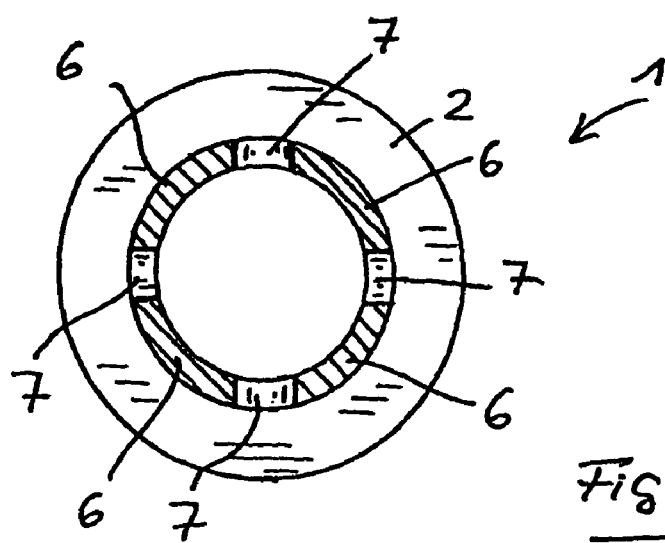
FIG. 2 shows a section through the blind rivet nut along the line II-II in FIG. 1, in an enlarged illustration of the blind rivet nut, without a metal sheet.

FIGS. 1 and 2 illustrate, for the first embodiment of the invention, the blind rivet nut 1 before it is set. The blind rivet nut 1 has a setting head 2 and a shank 3. The shank 3 is provided with an internal thread 4 in the region of its distal end or the end facing away from the setting head 2. A deformation portion 5 is positioned between the internal thread 4 and the setting head 2. Basically, the deformation portion 5 extends as far as the setting head 2, since the blind rivet nut 1 could be deformed in this region when a pull is introduced into the internal thread 4. In practice, since the blind rivet nut is to be connected to a plate-shaped component 9, such as metal sheet 9, this deformation portion 5 extends only as far as that side of the metal sheet which faces away from the setting head 2.

The shank 3 has, over the circumference of the shank 3, a weakening of shank wall 6 in a central region of the deformation portion 5. In the embodiment shown in FIGS. 1 and 2, this weakening is formed by four holes 7 of circular cross section which pass radially through the shank 3. The holes 7 are arranged on a circumferential circle of the shank 3, the circle plane of which corresponds to the sectional plane along the line II-II in FIG. 1, and is therefore arranged perpendicular to the shank longitudinal axis 8. The holes 7 are arranged or spaced uniformly around the circumference of the shank 3, and their hole center points therefore form an angle of 90 degrees with one another. The central weakened circumferential region 15 thus extends in the axial direction of the shank 3 corresponding to the extent of the holes 7 in the direction of the shank longitudinal axis 8. The weakening of the shank 3 over its circumference takes place by virtue of the plurality of holes 7 arranged on its circumference.

In the illustrated example, the outside diameter of the shank 3 is constant. The inside diameter of the shank 3 in the region of the deformation portion 5 is also constant and corresponds to the inside diameter of the setting head 2. The distance between the holes 7 and the internal thread 4 is shorter than the distance between the holes 7 and the setting head 2.

In one working example of the present invention, the following dimensions are obtained, for example, for a blind rivet nut 1 according to the invention, the internal thread 4 of which serves for receiving a screw M8:

| | |
|---|---|
| outside diameter of the shank 3: | 11.0 mm |
| inside diameter of the shank 3: | 9.5 mm |
| distance of the shank from the internal thread: | 10.0 mm |
| distance of the shank from the center of the respective hole: | 6.0 mm |
| diameter of the respective hole: | 1.5 mm |

The above dimensions of the subject blind rivet nut relate particularly to the fastening of the blind rivet nut to a metal sheet having a wall thickness of 0.5 to 7 mm. If blind rivet nuts, for example, for screws of size M8 are to be connected to thicker metal sheets, it is necessary to keep in only stock blind rivet nuts having different lengths.

FIG. 1 shows the blind rivet nut 1 which is inserted through a hole 10 having a circular cross section in the metal sheet 9. The outside diameter of the shank 3 of the blind rivet nut 1 is slightly smaller than the diameter of the hole 10. The blind rivet nut 1 bears with its setting head 2 against the metal sheet 9. A threaded mandrel, not shown, is then screwed into the internal thread 4, and the blind rivet nut 1 is fastened by means of a blind rivet nut setting appliance, such as is described, for example, in DE 198 08 685 A1.

In an intermediate state during the setting of the blind rivet nut 1, the setting head 2 is pressed against the metal sheet 9 by means of the blind rivet nut setting appliance, and the threaded mandrel, which is screwed into the internal thread 4, pulls that region of the shank 3 which has the internal thread 4 in the direction of the metal sheet 9 or the setting head 2. In this case, on account of the weakening of the shank wall 6 in the region of the holes 7, the central longitudinal region 12 of the shank wall 6 is deformed outwardly. As a result, in concrete terms, a deformation of the shank 3 over the short axial length of the latter starts in the region of this weakening of the shank 3. When the internal thread 4 is pulled further in the direction of the metal sheet 9 by means of the threaded mandrel, this results in the situation illustrated in FIG. 4, in which the closing head 11 is produced by virtue of the complete deformation of the deformation portion 5, with the exception of the region which corresponds to the wall thickness of the metal sheet 9. In the case of the relatively thin-walled metal sheet 9) FIG. 4, the closing head 11 is highly pronounced, that is to say it has a large diameter and a large thickness, since, during the riveting operation, the blind rivet nut 1 can be deformed over the relatively long length of the deformation portion 5. The closing head 11 is formed continuously, with a continuous bead 12 being formed in the region of the respective hole 7 previously present. A closed elongate slot contour 13 is formed between parallel bead walls of the respective bead 12, running transverse with respect to the longitudinal extent of the shank 3 and therefore running tangentially of the hole 7 previously passing through the shank wall 6. In the case of the relatively thin-walled metal sheet (FIG. 4), this slot contour 13 extends approximately in the region of half the thickness of the closing head 11 in relation to its extent in the direction of the shank longitudinal axis 8.

When a relatively thin-walled metal sheet is used, the deformation portion 5 may be deformed to an extent such that the diameter of the closing head 11 is as large as, if appropriate larger than, the diameter of the setting head 2.

Figure 5:
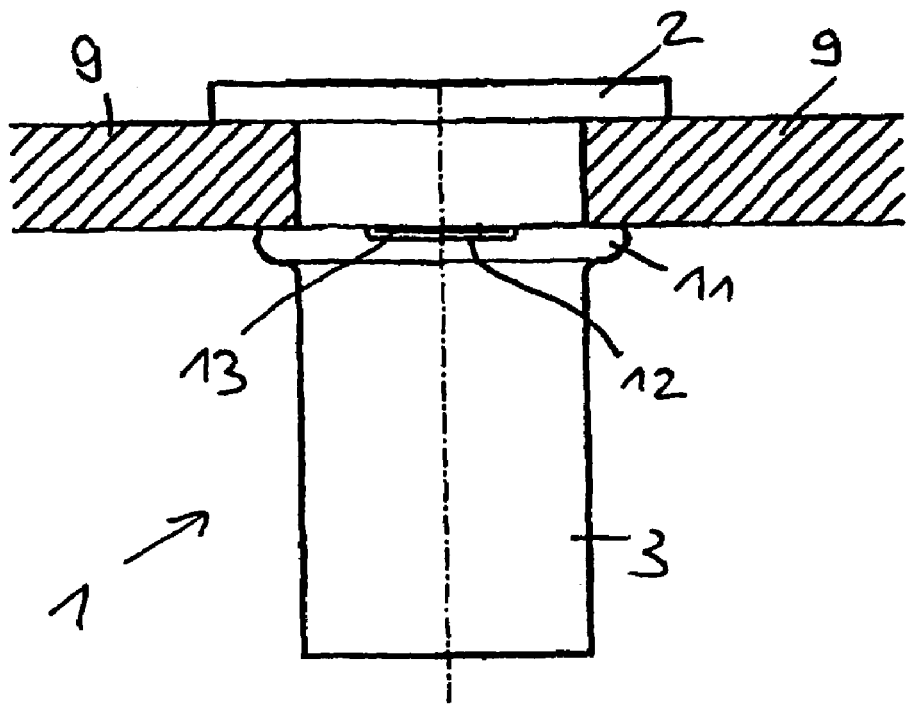
FIG. 5 shows the blind rivet nut according to the first or second embodiment, which is riveted to a relatively thick-walled metal sheet.

FIG. 5 illustrates the conditions of an identical blind rivet nut 1 which is riveted to a relatively thick-walled metal sheet 9. This figure shows that, on account of the thickness of the metal sheet, only a relatively small closing head 11 is formed. This has both a relatively small diameter and a relatively small thickness. Since deformation of the deformation portion 5 is possible only over a relatively small extent of the deformation portion 5 in the direction of the shank longitudinal axis 8, and the deformation emanates, as before, from that region of the blind rivet nut 1 to which the holes 7 are assigned, the bead 12, which occurs when the holes 7 are deformed during riveting, is located nearer to the bearing surface of the bead 13 against the relatively thin-walled metal sheet 9.

Figure 3:
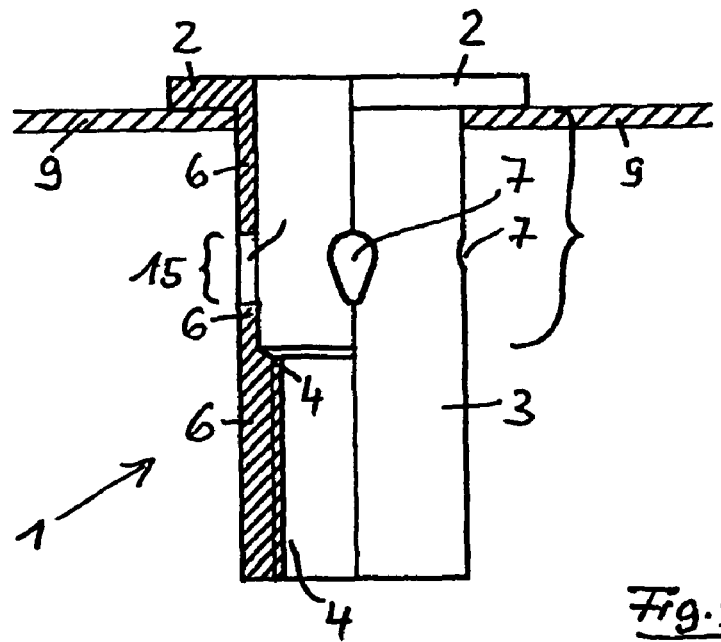
FIG. 3 shows a second embodiment of a blind rivet nut in an illustration according to FIG. 1.
Figure 4:
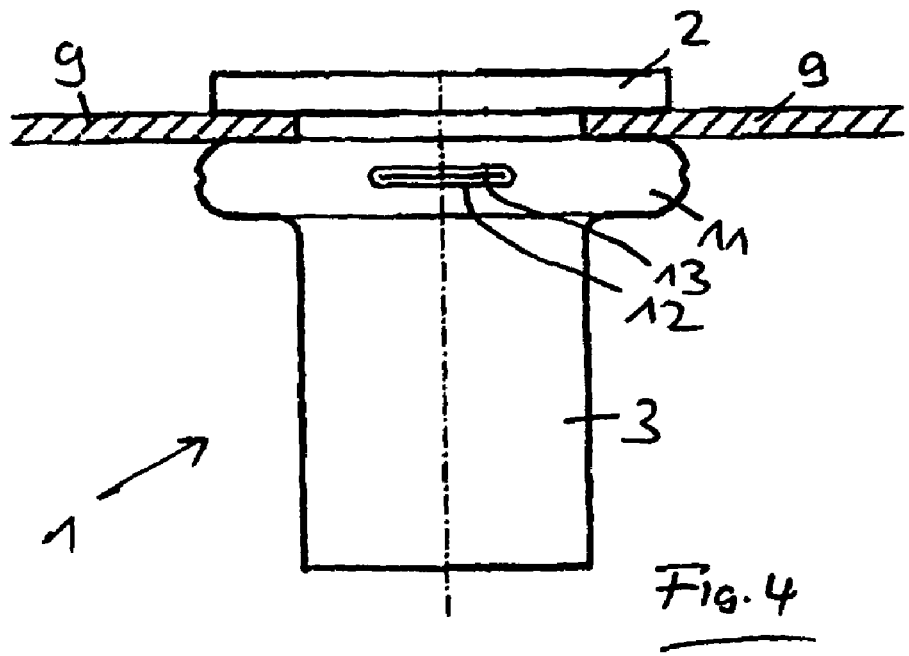
FIG. 4 shows the blind rivet nut according to the first or second embodiment, riveted to the relatively thin-walled metal sheet.

FIG. 3 shows a modified configuration of the blind rivet nut 1, as compared with the embodiment according to FIGS. 1 and 2. This differs from the embodiment according to FIGS. 1 and 2 only in that, instead of four holes 7 of circular cross section, four holes 7 of drop-shaped cross section are provided. The drop tip is oriented in the direction of the shank longitudinal axis 8, and is arranged so as to be directed away from the setting head 2. During the riveting of a blind rivet nut according to the embodiment shown in FIG. 3, the riveted situation, as illustrated in FIGS. 4 and 5 for the different metal sheet thicknesses, arises both in the case of a relatively thin-walled metal sheet according to FIG. 4 and in the case of a thick-walled metal sheet according to FIG. 5. Thus, during the riveting of the blind rivet nut 1, which is configured according to the embodiment shown in FIG. 3, the drop-shaped hole 7 is likewise deformed into a slot shape.

Figure 6:
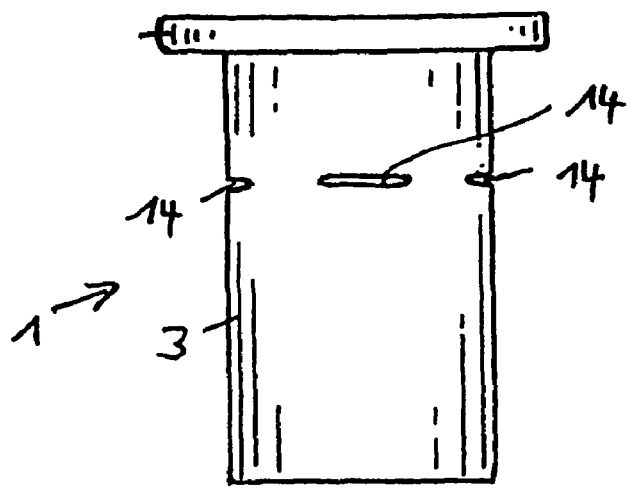
FIG. 6 shows a third embodiment of a blind rivet nut.

FIG. 6 shows a third embodiment of the blind rivet nut 1. It differs from the other two embodiments only in that, in relation to the initial state illustrated for these, instead of the configuration with the four holes 7 of circular or drop-shaped cross section, an arrangement with four slots 14 at a corresponding location is provided. Before the deformation of the deformation portion 5, these four slots 14 are therefore already present and, during the setting of the blind rivet nut, are further deformed tangentially, starting from this shape, with the result that the slots 14 are lengthened.

Figure 7:
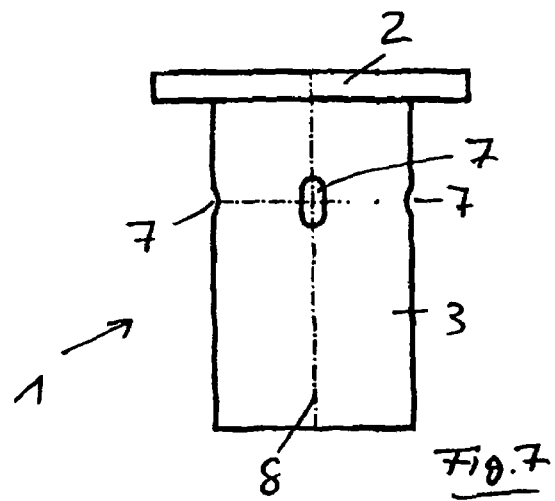
FIG. 7 shows a fourth embodiment of a blind rivet nut.

The blind rivet nut 1 according to the embodiment shown in FIG. 7 is modified, as compared with that according to FIGS. 1 and 2, only to the effect that, instead of the holes 7 of circular cross section, holes 7 are provided which are designed as long holes, the longitudinal axis of the long holes running parallel to the longitudinal axis 8 of the shank 3.

Figure 8:
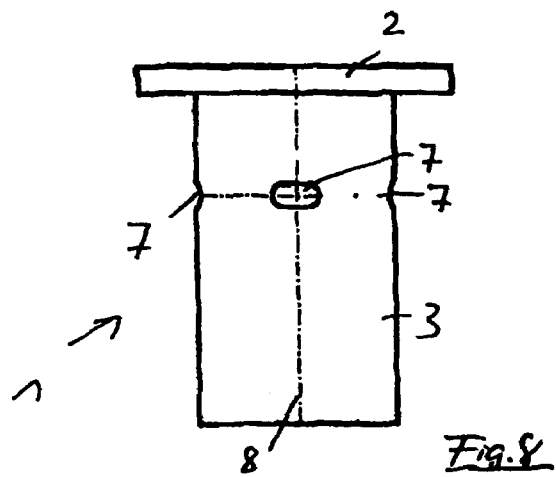
FIG. 8 shows a fifth embodiment of a blind rivet nut.

The embodiment according to FIG. 8 differs from that according to FIG. 7 only in that the longitudinal axes of the long holes 7 run transversely with respect to the longitudinal axis 8 of the shank 3.

Figure 8A:
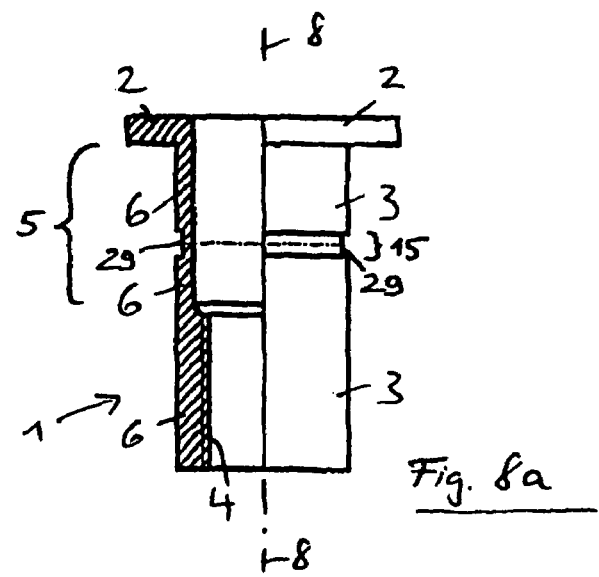
FIG. 8a shows a sixth embodiment of a blind rivet nut.

The embodiment according to FIG. 8a differs from that according to FIG. 8 only in that, instead of the transversely running long holes 7 passing through the shank wall 6 in the circumferential region 15, a continuous groove 29 is provided, which is introduced from outside into the shank wall 6 and has, for example, a rectangular cross section. The groove 29 located in the central circumferential region 5 is thus arranged on a circumferential circle of the shank 3, the circle plane of which is arranged perpendicular to the shank longitudinal axis 8. The depth of the groove 29 amounts, for example, at most to half the wall thickness of the shank wall 6 in that region of the shank 3 which is directly adjacent to the groove 29.

Figure 9A:
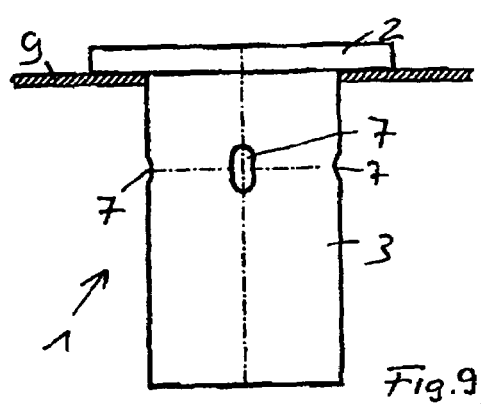
FIGS. 9a to 9d show different states of a blind rivet nut in the embodiment according to FIG. 7, to be riveted to a thin metal sheet, as illustrated starting from the insertion of the non-deformed blind rivet nut into the hole of the thin-walled metal sheet up to the state in which the blind rivet nut is riveted to the metal sheet.
Figure 10A:
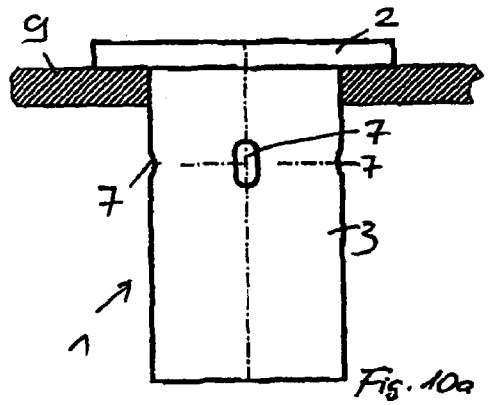
FIGS. 10a to 10d show illustrations corresponding to those of FIGS. 9a to 9d, with the riveting of the blind rivet nut in the embodiment according to FIG. 7 to a thicker metal sheet being illustrated.
Figure 9B:
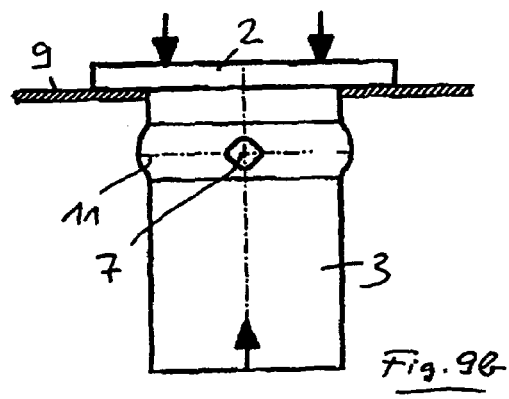
Figure 10B:
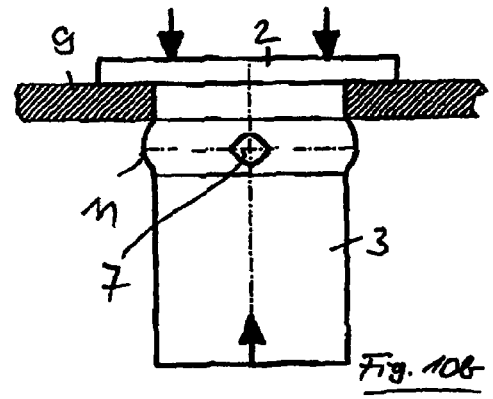
Figure 9C:
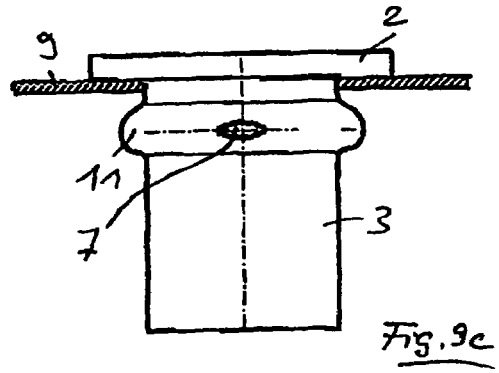
Figure 10C:
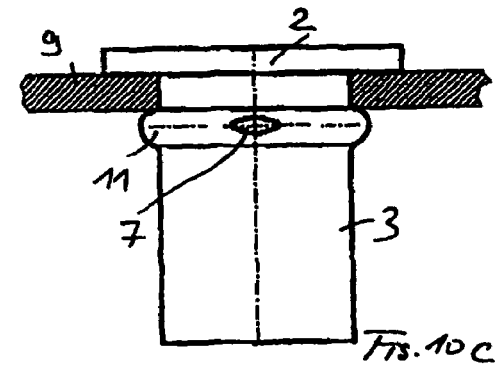
Figure 9D:
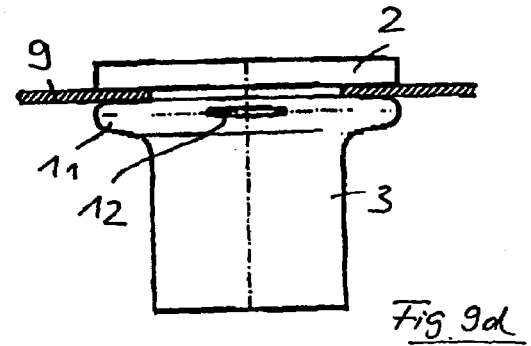
Figure 10D:
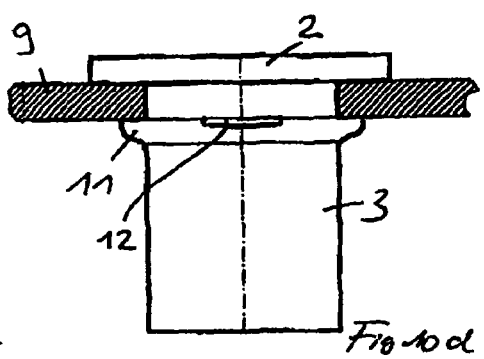

FIGS. 9a to 9d illustrate sequences in the riveting of a blind rivet nut 1, designed in the embodiment according to FIG. 7, to a thin-walled metal sheet 9. FIG. 9a shows the blind rivet nut 1 inserted into the hole of the metal sheet 9, and the setting head 2 of the blind rivet nut 1 bearing against the metal sheet 9. The setting head 2 is pressed against the metal sheet 9 by means of a suitable tool in terms of double arrows as illustrated in FIG. 9, so that the setting head 2 bears against the metal sheet 9 during the riveting operation. The blind rivet nut is riveted by means of a suitable tool which has a rotatable and axially displaceable threaded mandrel. For this purpose, the threaded mandrel is screwed from the setting head side into the internal thread 4 of the blind rivet nut 1 and is then displaced axially in the direction of the further single arrow according to FIG. 9b, such that a clinching of the deformation portion 5 takes place. On account of the destabilization of the shank 3 of the blind rivet nut 1 in a defined region of the deformation portion 5, in concrete terms in the region of the holes 7, the bead 11 is formed there at the start of the riveting operation. During the further axial displacement of the threaded mandrel, the bead 11 extends further in the direction of the setting head 2, and of that end of the shank 3 which faces away from the setting head 2, as is illustrated for this intermediate step in FIG. 9b. When the threaded mandrel is displaced further axially, the bead formation is intensified, with the result that, as may be gathered clearly from FIG. 9c, the holes 7 stretch in the tangential direction of the bead and are thus deformed according to an elongate slot. FIG. 9d shows the blind rivet nut 1 after the conclusion of the riveting operation. The relatively thin-walled metal sheet 9 is clamped between the setting head 2 and the closing head 11. The slot-shaped design of the bead can be gathered clearly.

FIGS. 10a to 10d show, corresponding to the illustration of FIGS. 9a to 9d, axial movement steps of the threaded mandrel during the riveting of a corresponding blind rivet nut 7, hence a blind rivet nut according to the embodiment shown in FIG. 7, but during riveting to a thicker-walled metal sheet 9. It may be gathered particularly from the illustration of FIGS. 10b and 10c that the bead 11 formed bears against the metal sheet 9 essentially earlier than in the case of a thin-walled metal sheet, and, as may be gathered particularly from the illustration of FIG. 10d, the formation of the closing head 11 is substantially less bulky than in the riveting of the blind rivet nut to a thin-walled metal sheet 9.

Figure 11:
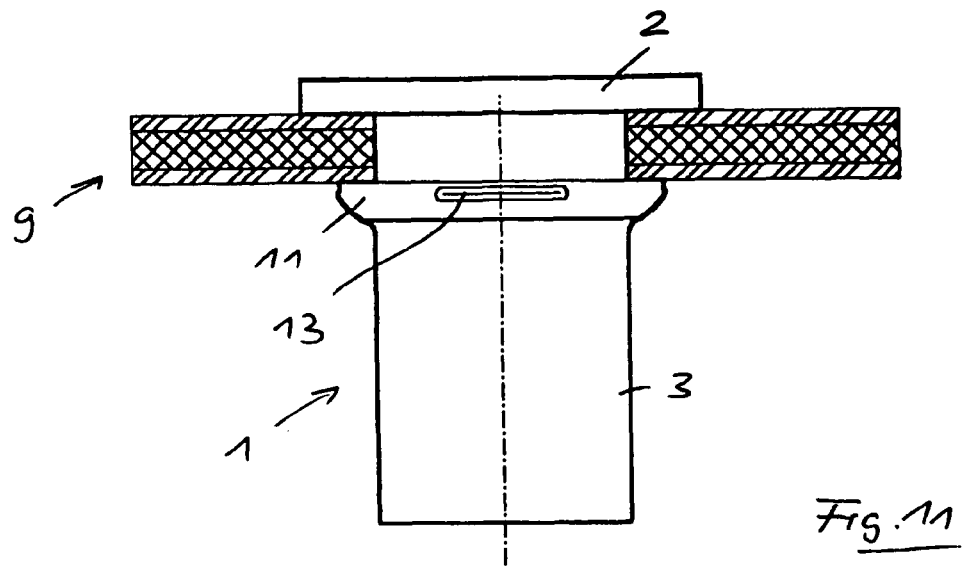
FIG. 11 shows a sectional illustration of a blind rivet nut according to the invention riveted to a component which is in sandwich form.

FIG. 11 illustrates a blind rivet nut 1 which is not riveted to a metal sheet 9, but, instead, to a component 9 configured in a sandwich type of construction. This component 9 is formed by two outer aluminium sheets with a foam board arranged between them, such that the three layers constituting a composite structure.

Figure 12:
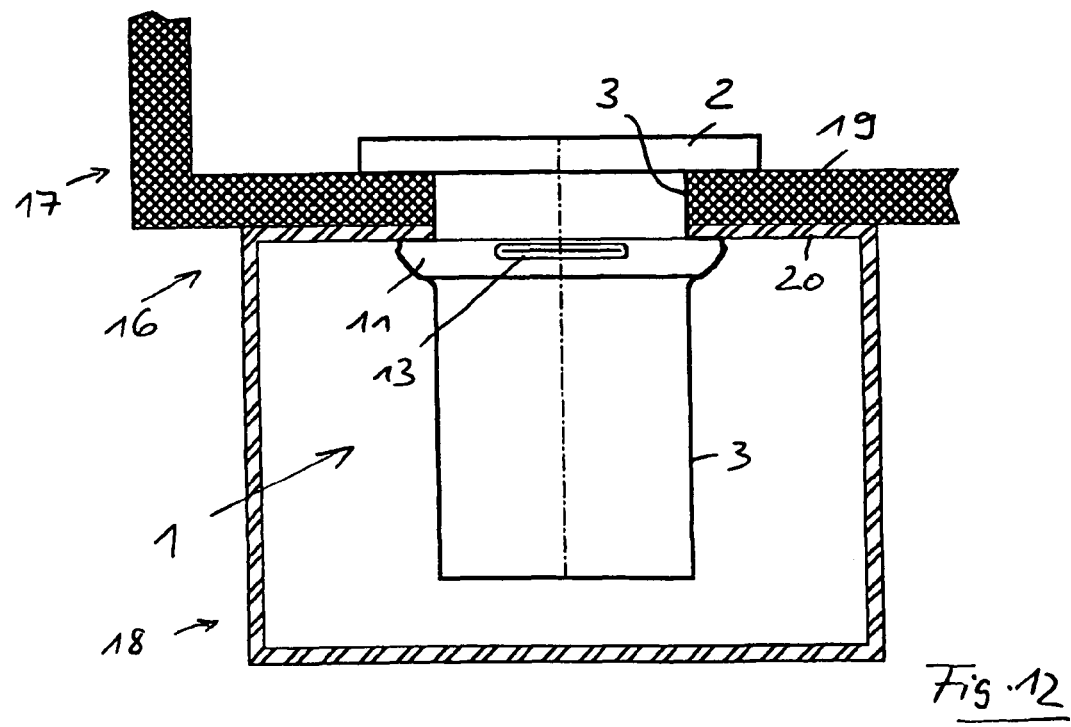
FIG. 12 shows, in a section, a riveted connection between the blind rivet nut according to the invention and a component arrangement which is formed by a plastic component and a metal component.

FIG. 12 shows a blind rivet nut 1 which is riveted to a component arrangement 16. This component arrangement consists of a plastic part 17 and a metal profile, with the shank 3 of the blind rivet nut 1 passing through aligned holes in wall portions 19 and 20, bearing one against the other, of the plastic part 17 and the metal profile 18. In this instance, the blind rivet nut 1 serves additionally for the connection of plastic parts 17 and a metal profile 18.

Figure 13:
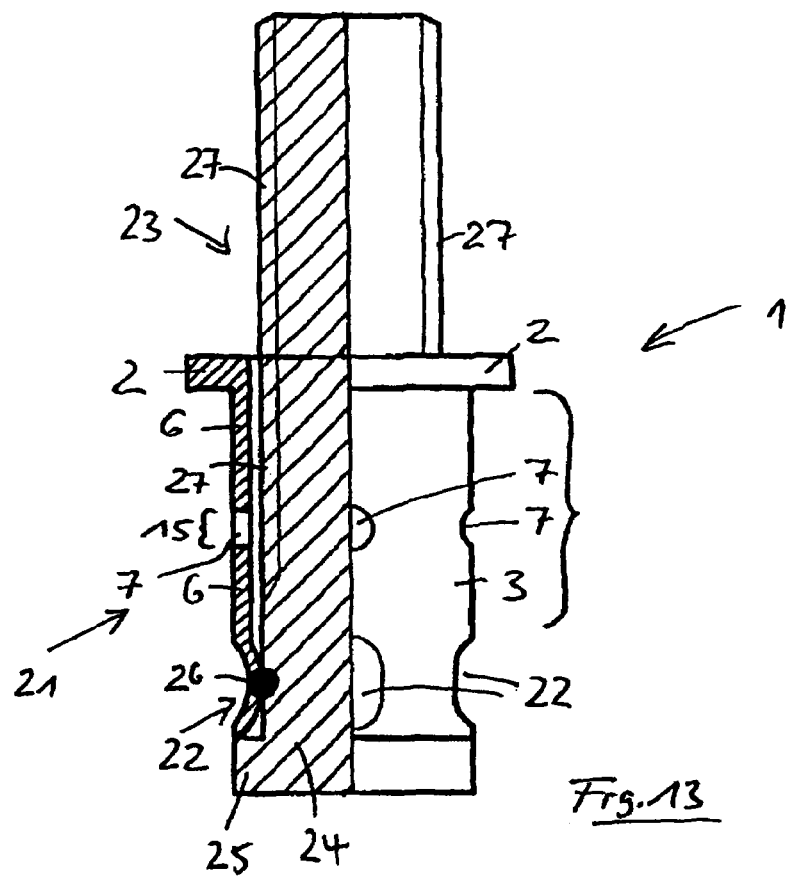
FIG. 13 shows a side view and partially sectional view of a blind rivet element according to the invention which is designed as a blind rivet threaded bolt, in an illustration corresponding to the illustration of the blind rivet nut according to FIG. 1, but without a metal sheet.

FIG. 13 shows a blind rivet element which is designed as a blind rivet threaded bolt 21. In respect of the features relevant to the invention, the blind rivet threaded bolt is designed according to the blind rivet nut 1 described above, and the blind rivet threaded bolt 21 can be modified correspondingly to the various embodiments of the blind rivet nut 1 which have been described. Reference is made to that extent to the above figure descriptions in order to avoid repetition.

The blind rivet threaded bolt 21 thus has the setting head 2, the shank 3, the deformation portion 5, the four circular holes 7 provided in the exemplary embodiment and the circumferential region 15 defined by these holes. Instead of the thread 4 in the blind rivet nut 1, the shank 3 of the blind rivet threaded bolt 21 has in the conventional way, a receptacle 22 for a threaded bolt 23 in the region of its end facing away from the setting head 2. This threaded bolt 23 has a threadless stepped end portion 24, the widened region 25 of which is in contact with the receptacle 22 of the shank 3. Correspondingly to the arrangement of the four holes 7 in the region of the deformation portion 5 of the shank 3, the shank 3 has, in the region of the receptacle 22, radially inwardly curved regions which are in contact with the end portion 24 of the threaded bolt 23 in the region of the reduced diameter of the end portion 24. The shank 3 is welded to the threaded bolt 23, with the weld being illustrated by a spot 26 for one of the four welding regions. The threaded bolt 23 welded to the shank 3 has an external thread 27 with the exception of its region of the end portion 24, onto which a suitable tool can be screwed by means of an axially displaceable nut in order to set the blind rivet threaded bolt.

Figure 14:
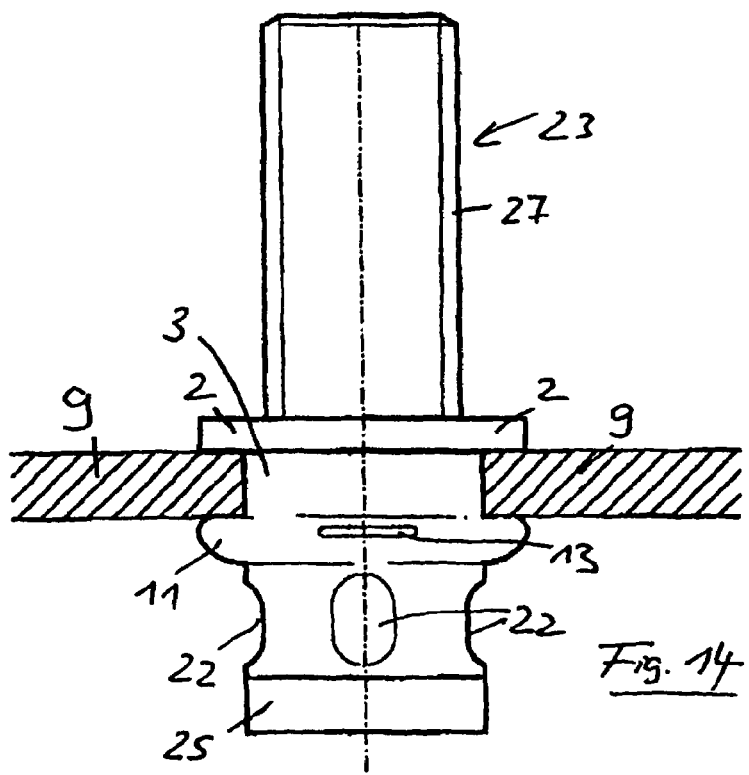
FIG. 14 shows the blind rivet threaded bolt illustrated in FIG. 13, which is riveted to a relatively thick-walled metal sheet.

FIG. 14 shows the threaded bolt 23 which is riveted to a relatively thick-walled metal sheet 9.

Figure 15:
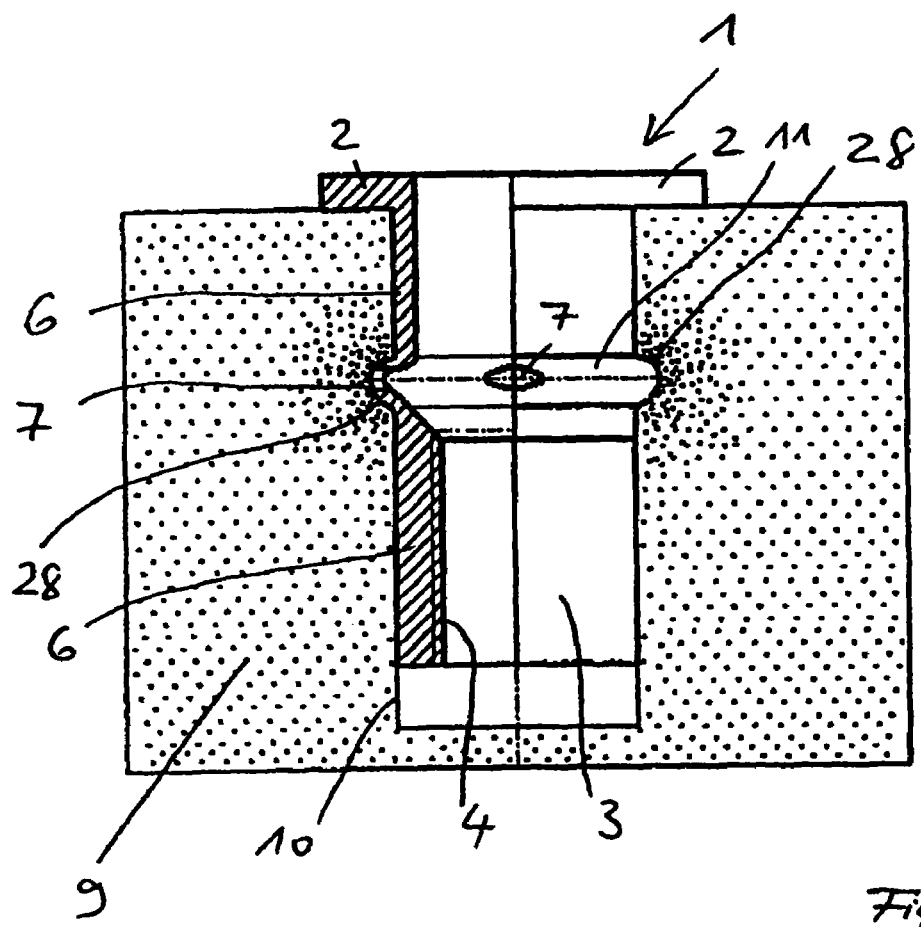
FIG. 15 shows an alternative use of a blind rivet element which is designed in the exemplary embodiment as a blind rivet nut, the blind rivet element being inserted into the deformably configured component, and the closing head generated during setting engaging into a radial recess of the component.

FIG. 15 shows a novel use of a blind rivet element which is designed in the exemplary embodiment as a blind rivet nut 1, but may also be a blind rivet threaded bolt 21.

The thick-walled component 9 is illustrated in FIG. 15, with the material of the component 9 being softer than metal. The component 9 consists, for example, of wood. The component 9 is provided with the hole 10 which is designed, for example, as a blind hole. The depth of the hole 10 is greater than the longitudinal extent of the blind rivet nut 1. The blind rivet nut 1 is inserted into the hole 7 and the setting operation described with regard to FIGS. 9a to 9d is executed. Thus, the setting head 2 is pressed against the component 9, and the threaded mandrel screwed into the internal thread 4 of the blind rivet nut 1 is displaced axially, with the result that the blind rivet nut 1 is deformed in a defined way on account of destabilization by the holes 7. The deformation leads to the radially outwardly directed formation of the bead, with the result that the bead or closing head 11 deforms the component 9 consisting of softer material than the metallic blind rivet nut 1, so that the closing head engages radially into the recess 28 thus formed in the component 9. The blind rivet nut 1 is therefore held positively in the component 9.

FIG. 15 illustrates a modification of the blind rivet nut to the effect that it is designed to be longer and the holes 7 are arranged at a greater distance from the setting head 2.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A blind fastener, comprising:
   a setting head portion having a predetermined outside diameter, and being shaped for abutting engagement with an apertured workpiece; and
   a shank portion having one end thereof connected with said setting head portion, and an opposite end thereof having one of an internal thread and a threaded bolt receptacle; said shank portion also having a longitudinal axis, and a sidewall with an outside diameter that is smaller than said outside diameter of said setting head portion, and is configured for close reception in an aperture of the workpiece prior to being upset, as well as a deformation area that is upset radially outwardly to secure said fastener to the workpiece; said deformation area of said shank portion being disposed between said setting head portion and said one of said internal thread and said threaded bolt receptacle, and including a precisely located central circumferential region thereof which provides the sole weakening for said sidewall, and is substantially imperforate except for a plurality of radially oriented apertures arranged transversely relative to said longitudinal axis of said shank portion, which accurately and reliably commence the radially outwardly inelastic expansion of said deformation area at said central circumferential region when said deformation area is being upset, and thereby form a doubled over, annularly-shaped bead which extends substantially continuously about said sidewall of said shank portion, and bears tightly against the aperatured workpiece directly opposite said setting head portion at a location radially adjacent to the center of the workpiece aperture to create a very secure and low profile blind fastener.

2. A blind fastener as set forth in claim 1, wherein:
said apertures comprise holes.

3. A blind fastener as set forth in claim 1, wherein:
said apertures comprise slots arranged mutually parallel relative to the longitudinal axis of said shank portion and extending over a short length thereof.

4. A blind fastener as set forth in claim 1, wherein:
said apertures extend completely through said shank portion.

5. A blind fastener as set forth in claim 1, wherein:
said shank portion has a constant outside diameter between said setting head portion and said one of said internal thread and a threaded bolt receptacle.

6. A blind fastener as set forth in claim 1, wherein:
said shank portion has a constant inside diameter between said setting head portion and said one of said internal thread and a threaded bolt receptacle.

7. A blind fastener as set forth in claim 1, wherein:
said apertures are arranged along a circumferential circle of said shank portion which is disposed perpendicular with the longitudinal axis of said shank portion.

8. A blind fastener as set forth in claim 1, wherein:
said apertures comprise at least two circumferentially spaced apart apertures.

9. A blind fastener as set forth in claim 1, wherein:
said apertures have a generally circular cross-sectional shape.

10. A blind fastener as set forth in claim 1, wherein:
said apertures have an elongate shape with the longest axis thereof disposed either perpendicular or parallel with the longitudinal axis of said shank portion.

11. A blind fastener as set forth in claim 1, wherein:
said deformation area is configured such that the distance from said central circumferential region of said deformation area to said one of said internal threads and said threaded bolt receptacle is larger than the distance between said central circumferential region of said deformation area and said setting head portion.

12. A blind fastener as set forth in claim 1, wherein:
said fastener is constructed from metal.

13. A blind fastener as set forth in claim 1, wherein:
said fastener comprises a blind rivet nut or a blind rivet threaded bolt.

* * * * *